Dec. 13, 1938.   W. HARTZ   2,139,892
AUTOMATIC VARIABLE SPEED TRANSMISSION
Filed Aug. 7, 1937   3 Sheets-Sheet 1
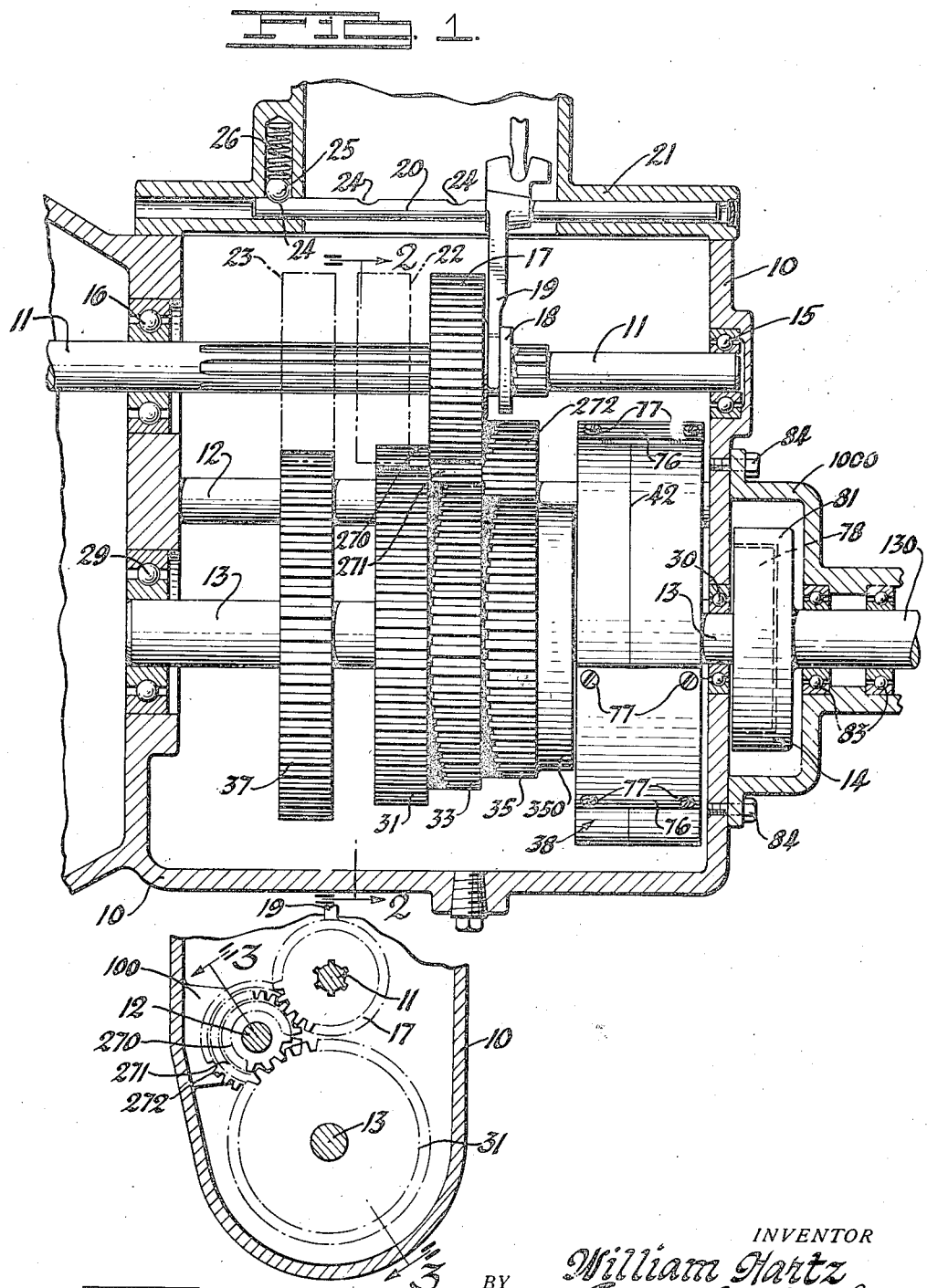
INVENTOR
William Hartz
BY Everett H. Wright
ATTORNEY

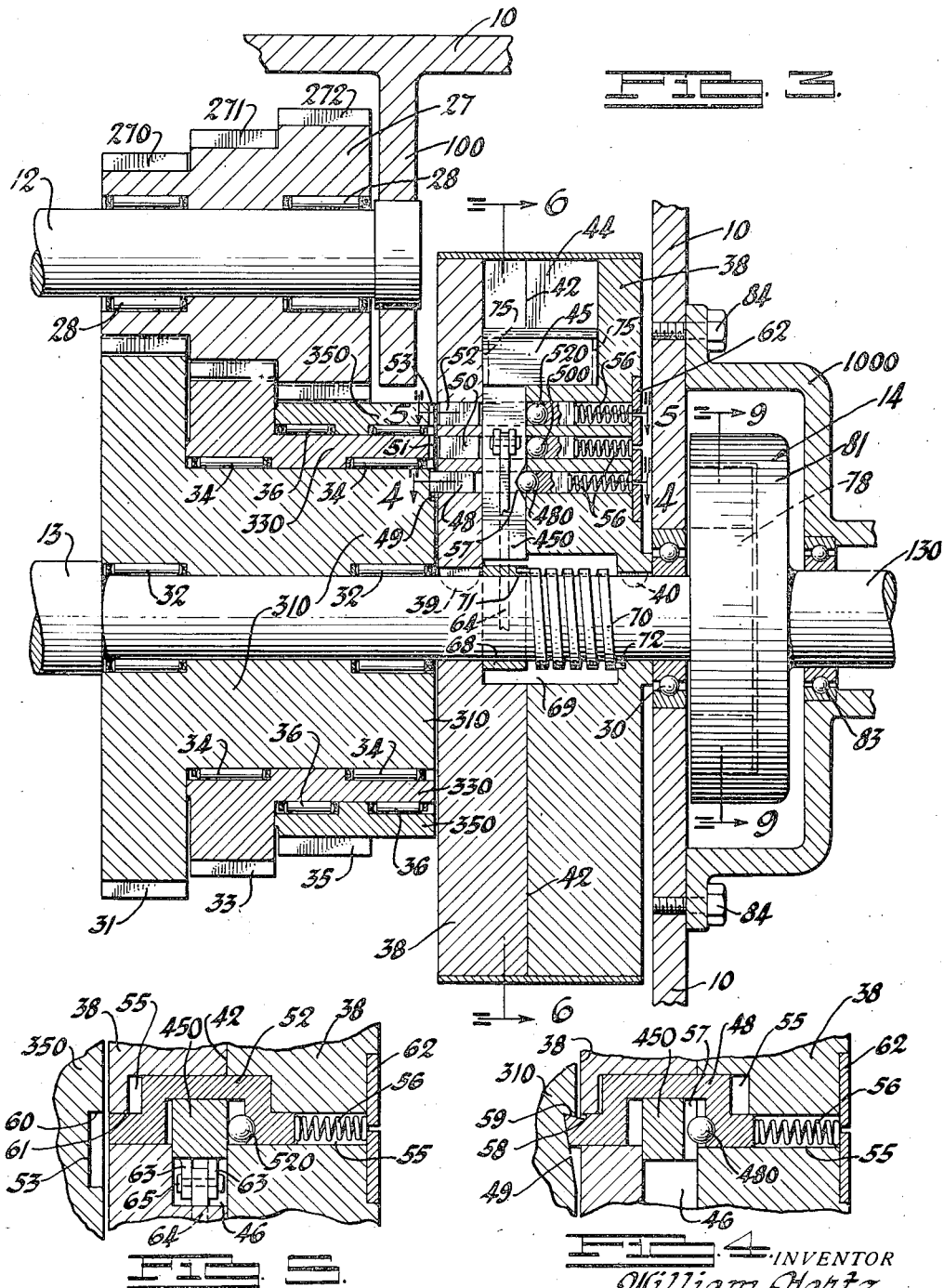

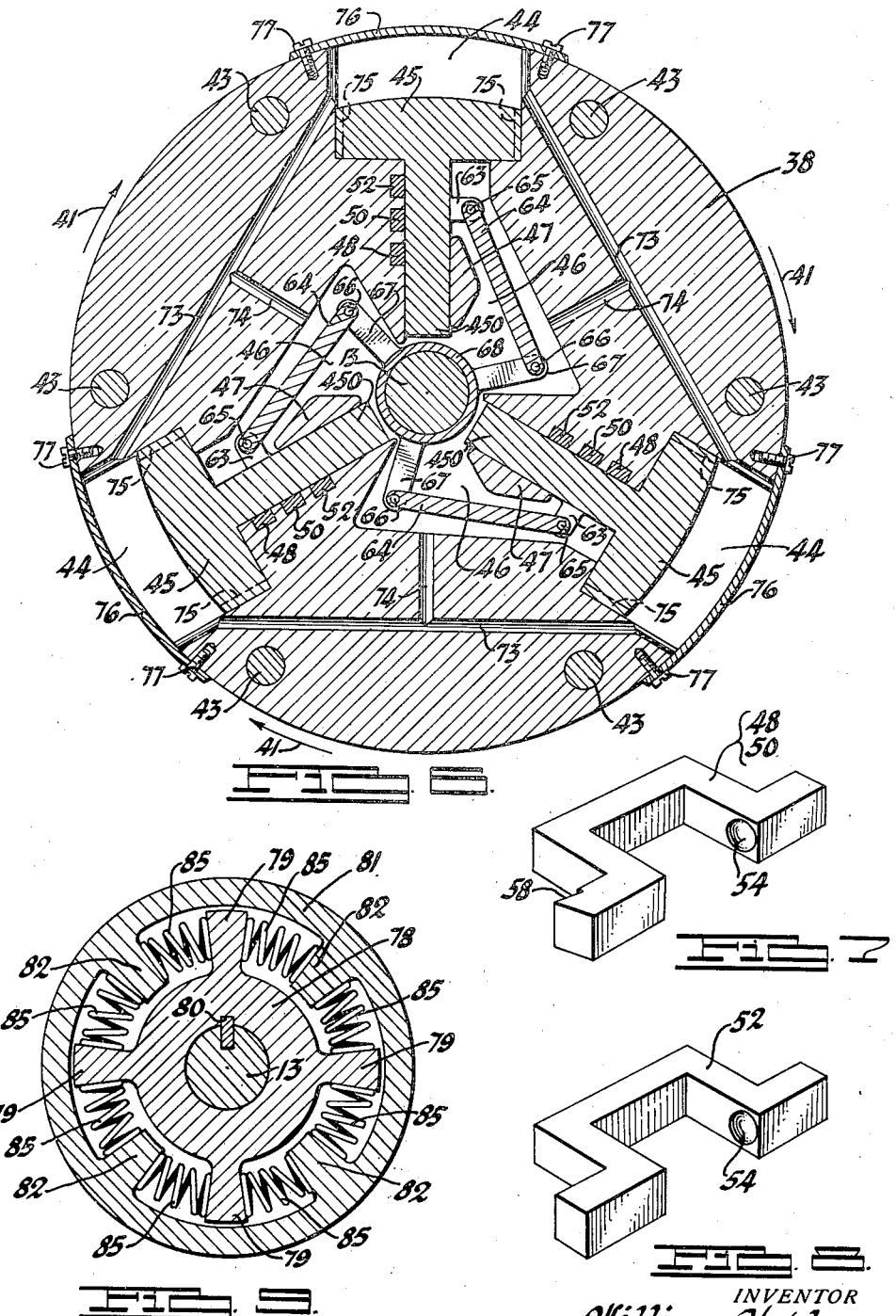

Patented Dec. 13, 1938

2,139,892

UNITED STATES PATENT OFFICE 2,139,892

AUTOMATIC VARIABLE SPEED TRANSMISSION

William Hartz, Detroit, Mich.

Application August 7, 1937, Serial No. 157,923

12 Claims. (Cl. 74—336.5)

This invention relates to variable speed transmission and in particular to automatic means for changing gear ratios in a type of transmission generally adapted for use in motor vehicles and the like.

One object of the invention is to provide, in combination with a transmission, improved, simple, inexpensive means for automatically varying the gear ratio between a driving shaft and a driven shaft responsive to the speed of the driven shaft whereby the speed of the driving shaft is maintained substantially constant at the time of change of gear ratio.

Another object of the invention is to provide a constant mesh variable speed transmission for automotive vehicles and the like wherein a plurality of changes in forward speed ratios may be accomplished automatically under control of the centrifugal force of the driven shaft thereof.

Another object of the invention is to provide a centrifugal controlled ratchet type automatic gear selector for transmissions comprising sets of low, intermediate and high speed ratchet stops controlled by a plurality of radially reciprocating cams, and interlocking means for said cams causing the said cams to reciprocate in coincidental intermittent steps whereby to cause said ratchet stops to act in unison.

Another object of the invention is to provide a constant mesh variable speed transmission for automotive vehicles wherein free wheeling is permitted at the forward low and intermediate speeds and wherein the high speed operation is of the conventional positive engagement type.

Another object of the invention is to provide a simple, compact, inexpensive centrifugal controlled ratchet type automatic gear selector for transmissions of automobiles and the like having in combination therewith means for relieving the impact between the ratchets of the said gear selector and the gearing selectively engaged thereby when changes from one forward speed gear engagement to another is automatically accomplished.

Another object of the invention is to provide a simple, compact, inexpensive centrifugal controlled ratchet type automatic gear selector for transmissions of automobiles and the like wherein ratchet stops adapted to selectively engage the driven gears of the said transmission are so shaped as to avoid the operation of the said gear selector at certain critical speeds when the motor speed of the automobile equipped therewith varies slightly or when the speed of the said automobile varies slightly due to acceleration and deceleration caused by the operator of the said automobile or by a varying gradient of the highway over which the said automobile is driven.

Another object of the invention is to provide an automatic variable speed transmission for automotive vehicles wherein changes in forward speed ratios are accomplished automatically responsive to the speed of the driven shaft but under control of the operator of the vehicle.

Other objects of the invention will become apparent by reference to the following detailed description taken in connection with the accompanying drawings, in which:

Fig. 1 is a longitudinal sectional view of a transmission embodying the invention.

Fig. 2 is a cross sectional view of the said transmission taken on the line 2—2 of Fig. 1.

Fig. 3 is an enlarged detailed longitudinal sectional view taken on the line 3—3 of Fig. 2 showing the forward gearing of the transmission disclosed in Fig. 1 with a ratchet type automatic gear selector unit embodying the invention engaged in its low speed position.

Fig. 4 is a detailed fragmentary sectional view taken on the line 4—4 of Fig. 3.

Fig. 5 is an enlarged fragmentary sectional view taken on the line 5—5 of Fig. 3.

Fig. 6 is a cross sectional view taken on the line 6—6 of Fig. 3.

Fig. 7 is a view in perspective showing the preferred shape of the low and intermediate speed ratchet stops employed in the invention.

Fig. 8 is a view in perspective showing the preferred shape of a high speed ratchet stop employed in the invention.

Fig. 9 is a cross sectional view taken on the line 9—9 of Fig. 3 showing the preferred torque impact absorbing mechanism which is preferably used with the invention.

Referring now to the drawings wherein like numerals refer to like and corresponding parts throughout the several views, the embodiment of the invention disclosed comprises, in general, a housing 10, a drive shaft 11 which is preferably connected to a source of power such as an automotive engine through a suitable clutch in the usual manner, an idler shaft 12, and a driven shaft 13 which may be connected through any suitable torque impact absorbing mechanism 14, if such is desirable, and a universal joint, not shown, to the propeller shaft of a motor vehicle; the said shafts 11, 12 and 13 being inter-connected by a plurality of gears as hereinafter described.

The drive shaft 11 is preferably journaled at one end in the housing 10 by means of the bearing 15 and has the other end thereof journaled through the front of the said housing 10 by means of the bearing 16. A driving gear 17 having a shift collar 18 is splined on the drive shaft 11 for rotation therewith and longitudinal movement thereon. The said driving gear 17 is shown in Fig. 1 engaged with the gearing 271 of the tripple idler gear 27, however, it may be shifted by means of the usual shift fork 19 on a rod 20 slidably mounted in the top plate 21 of the housing 10 to a neutral position as indicated by dash and two dot lines 22 or into a reverse position as indicated by the dash and dot lines 23. The shift fork 19 and rod 20 may be moved to the desired position by any manual means not shown, however, it is preferable to prevent the said rod 20 and shift fork 19 thereon from creeping by providing the said rod 20 with a plurality of suitably disposed notches 24 into which a ball detent 25 is urged by a spring 26 as shown in Fig. 1 for releasably maintaining the said rod 20, shift fork 19 and driving gear 17 in the position into which they are shifted.

The idler shaft 12 is mounted at one end in the front of the housing 10 and at the other end thereof in the partition 100 of the said housing 10 and is preferably keyed against rotation therein. A triple idler gear 27 is suitably rotatably mounted on the said idler shaft 12 by such suitable means as the roller bearings 28. The said triple idler gear 27 is preferably formed with the slow speed gearing 270, intermediate speed gearing 271 and high speed gearing 272 thereof all rotating at the same speed and driven by the driving gear 17 when the said driving gear 17 is meshed with the intermediate speed gearing 271 thereof.

Although the embodiment of the invention disclosed herein indicates that the driving gear 17 meshes with the intermediate speed gearing 271 of the triple idler gear 27, the said driving gear 17 may be arranged to mesh with the low speed gearing 270 or the high speed gearing 272 of the said triple idler gear 27 if lower or higher engine speeds respectively are desirable.

The driven shaft 13 is journaled at one end in the housing 10 by means of the bearing 29 and has the other end thereof journaled to the rear of the said housing 10 by means of the bearing 30. The driven shaft 13 is suitably shouldered to accommodate a low speed driven gear 31 rotatably mounted thereon by such suitable means as the roller bearings 32. The said low speed driven gear 31 is preferably provided with an axially extending collar 310 which serves as a shaft upon which an intermediate speed driven gear 33 is rotatably mounted by such suitable means as the roller bearings 34. The said intermediate speed driven gear 33 is provided with an axially extending collar 330 which serves as a shaft upon which a high speed driven gear 35 is rotatably mounted by such suitable means as the roller bearing 36. Thus, the low speed driven gear 31, intermediate speed driven gear 33 and high speed driven gear 35 are adapted to freely rotate with respect to each other and the driven shaft 13. As best shown in Fig. 3, the high speed driven gear 35 is provided with an axially extending collar 350 the end of which is in radial alignment with the end faces of the axially extending collars 310 and 330 of the low and intermediate speed driven gears respectively. A reverse gear 37 is keyed on the driven shaft 13 in a position to be readily engaged by the driving gear 17 as hereinbefore described.

A ratchet type automatic gear selector unit generally designated by the numeral 38 in the drawings is mounted on the driven shaft 13 and keyed thereto by suitable keys 39 and 40 for rotation therewith. The said gear selector unit 38 is located axially in operating spaced relationship to the end faces of the said axially extending collars 310, 330 and 350 of the said low speed driven gear 31, intermediate speed driven gear 33 and high speed driven gear 35 respectively. The direction of rotation of the said gear selector unit 38 and the driven shaft 13 during low, intermediate and high forward speeds is indicated by the arrows 41 in Fig. 6.

The said ratchet type automatic gear selector unit 38 is cylindrical in shape and is preferably axially split along the line 42 as indicated in Figs. 1 and 3 to admit of ease in the construction and assembly thereof, the said automatic gear selector unit 38 being secured in its assembled relationship as shown in Fig. 3 by means of the bolts 43 shown in Fig. 6. The said automatic gear selector unit 38 is preferably provided with a plurality of rectangular radially disposed chases 44 equally circumferentially spaced with respect to each other around the periphery of the said gear selector unit 38, three of the said radially disposed chases 44 being provided in the embodiment of the invention shown in the drawings. Each radially disposed chase 44 is so shaped as to reciprocatingly accommodate a T-shaped L-head cam 45 as best indicated in Figs. 3 and 6, the heads of the said cams 45 being adapted to reciprocate in the said radially disposed chases 44 while the stems of the said T-shaped L-head cams 45 are radially disposed toward the center of the said gear selector unit 38 as shown in Fig. 6. The central portion of the said gear selector unit 38 is preferably hollowed out as indicated by the numeral 46 in Fig. 6 to accommodate means for causing the said cams 45 to reciprocate only coincidentally with respect to each other, guides 47 being provided adjacent to the stems of the said T-shaped L-head cams 45 to maintain the same in perfect radial alignment during the reciprocation thereof.

In the embodiment of the gear selector unit 38 shown in the drawings, sets of axially disposed low speed ratchet stops 48, intermediate speed ratchet stops 50 and high speed ratchet stops 52 are circumferentially spaced at 120 degrees with respect to each other. The said low speed ratchet stops 48, intermediate speed ratchet stops 50 and high speed ratchet stops 52 are located at such radii from the center of the driven shaft 13 as will permit the same to register with and engage low, intermediate and high speed notches 49, 51 and 53 respectively circumferentially spaced at 120 degrees with respect to each other in the end face of the collars 310, 330 and 350 of the low, intermediate and high speed gears 31, 33 and 35, both respectively, see Figs. 3, 4, 5 and 6.

As best illustrated in Figs. 4, 5, 7 and 8 the ratchet stops 48, 50 and 52 are formed generally U-shaped to off-set around the stem of the T-shaped L-head cam 45. A spherical socket 54 is provided in each of the said ratchet stops 48, 50 and 52 as indicated in Figs. 7 and 8 to accommodate cam contact balls 480, 500 and 520 respectively. The said ratchet stops 48, 50 and 52 are reciprocatingly positioned in suitable axially disposed ratchet chases 55 and are constantly urged toward engagement with the low, intermediate and high speed gears 31, 33 and 35 at the ratchet notches 49, 51 and 53 respectively therein by means of suitable ratchet springs 56 which react against the ratchet spring cover plate 62 suitably secured to the gear selector unit 38.

The stem of each of the T-shaped L-head cams 56 is preferably provided with a suitably disposed V-notch as indicated by the numeral 57 in Figs. 3 and 4 to receive one of the cam contact balls 480, 500 and 520 when the said cam notch 57 is positioned opposite one of the said cam contact balls whereby to permit one of the ratchet stops 48, 50 and 52 of each set of ratchet stops in the gear selector unit 38 to be urged into contact with low, intermediate or high speed gears 31, 33 or 35 respectively at the low, intermediate or high speed notches 49, 51 or 53 in the end face of the radially aligned collars of the said gears.

Fig. 4 shows in detail the low speed ratchet stop 48 of the gear selector unit 38 urged into engagement with the low speed gear 31 at the beveled notch 49 in the end face of the collar 310 of the said low speed gear 31, the V-notch 57 of the stem of the T-shaped L-head cam 45 being positioned opposite the cam contact ball 480 of the said low speed ratchet stop 48.

Fig. 5 shows in detail the high speed ratchet stop 52 of the gear selector unit 38 positioned opposite the rectangular notch 53 in the end face of the collar 350 of the high speed gear 35, the side surface of the stem of the T-shaped L-head cam 45 being positioned opposite the cam contact ball 520 of the high speed ratchet stop 52 whereby the said high speed ratchet stop 52 is maintained in the position shown in Fig. 5 out of engagement with the high speed gear 35.

The only difference between the low speed ratchet stop 48 and the high speed ratchet stop 52 is that the end of the low speed ratchet stop 48 is notched and beveled as best indicated in Figs. 4 and 7 to permit the said low speed ratchet stop to engage the complementarily beveled notch 49 in the end face of the collar 310 of the low speed gear 31. By beveling the notches 49 in the end face of the collar 310 of the low speed gear, free wheeling is permitted automatically when the low speed ratchet stops 48 of the gear selector unit 38 are permitted by the T-shaped L-head cams 45 to engage the low speed gear 31 at the said beveled notches 49 in the end face of the collar 310 thereof.

The bearing surface of the low speed ratchet stop 48 is notched as indicated by the numeral 58 in the drawings to correspond with the complementarily re-entrant angularly disposed contact surface 59 of the low speed gear 31 formed therein at the notch 49 in the end face of the collar 310 thereof. By providing reentrant contact surfaces 59 at the notches 49 in the end face of the collar 310 of the low speed gear 31 as best illustrated in Fig. 4, and by providing the bearing surface of the low speed ratchet stop 48 with a suitable notch 58 complementary to the reentrant contact surfaces 59 formed in the end face of the collar 310 of the low speed gear 31 by the notches 49 therein, the T-shaped L-head cams 45 will not radially reciprocate until there has been a material variation between the speed of the driven low speed gears 31 and the driven shaft 13 to which the said gear selector unit 38 is keyed. Therefore, the gear selector unit 38 will be prevented from operating unnecessarily at certain critical speeds when the motor speed of a vehicle equipped therewith varies slightly or when the speed of the automobile varies slightly due to acceleration or deceleration caused by wind pressure or a varying gradient of the highway over which the said automobile is driven.

If the bearing surface between the ratchet stops 48, 50 and 52 and the contact surface of the low, intermediate and high speed driven gears 31, 33 and 35 engaged by said ratchet stops are of sufficient area or roughened to create sufficient frictional resistance therebetween, no notches 58 or re-entrant contact surfaces 59 need be provided in the ratchet stops or driven gears to prevent the said gear selector unit 38 from operating responsive to the speed of the driven shaft when the driver of the vehicle equipped therewith constantly applies power to the driven shaft.

Although the bearing surface of the high speed ratchet stop 52 is shown un-notched as indicated by the numeral 61 in the drawings to correspond with the complementarily axially disposed straight contact surface 60 of the high speed gear 35 at the notch 53 in the end face of the collar 350 thereof, the said bearing surface 61 and contact surface 60 of the high speed ratchet stop 52 and high speed gear 35 respectively may be formed the same as the bearing surface 58 and contact surface 59 of the low speed ratchet stop 48 and low speed gear 31 respectively as hereinbefore described.

If free wheeling is desired in intermediate speed, the intermediate speed ratchet stops 50 and the notches 51 in the end face of the collar 330 of the intermediate speed gear 33 are formed the same as the low speed ratchet stops 48 and the notches 49 in the end face of the collar 310 of the low speed gear 31 as shown in Figs. 4 and 7, however, if free wheeling in intermediate speed is not desired, the intermediate speed ratchet stops 50 and the notches 51 in the end face of the collar 330 of the intermediate speed gear 33 are formed the same as the high speed ratchet stops 52 and the notches 53 in the end face of the collar 330 of the high speed gear 33.

The stem 450 of each of the T-shaped L-head cams 45 is preferably provided with a pair of suitably spaced lugs 63 between which a link 64 is positioned and pivoted to the said lugs by a pivot pin 65. The opposite end of the said link 64 is pivotally connected by means of a pivot pin 66 to a radially disposed lever 67 preferably integral with and projecting from a ring 68 suitably turnably mounted on the driven shaft 13 within the gear selector unit 38 in an axially disposed annular chase 69 therein adjacent to the said driven shaft 13 onto which the said gear selector unit 38 is keyed. The said ring 68 is provided with one lever 67 for each T-shaped L-head cam 45. In the embodiment of the invention disclosed herein three levers 67 are provided which project radially at 120 degrees with respect to each other from the said ring 68.

A torsional spring 70 is positioned in the said axially disposed annular chase 69 around the driven shaft 13 and is anchored in one end in the turnable ring 68 as indicated by the numeral 71 in Fig. 3 and is anchored at the other end in the gear selector unit 38 as indicated by the numeral 72 in Fig. 3, the said torsional spring 70 being tensioned in such a manner as to create sufficient centripetal force on the T-shaped L-head cams 45 as to constantly urge the same toward their low speed position as shown in Figs. 3 and 6.

The gear selector unit 38 is preferably provided with a plurality of oil bores 73 and 74 which communicate between the radially disposed chases 44 and the hollowed out portion 46 of the said gear selector unit 38, and the heads of the T-shaped L-head cams 45 are preferably provided with suitable oil grooves 75, all of which permit a free circulation of lubricant within the said gear selector unit 38 when lubricant therein is displaced by the reciprocation of the said T-shaped L-head cams 45. In order to prevent foreign matter from entering the gear selector unit 38 during the reciprocation of the T-shaped L-head cams 45, the radially disposed chases 44 thereof are preferably covered by suitable cover plates 76 secured to the periphery of the said gear selector unit 38 by suitable bolts 77.

A suitable torque impact mechanism 14 shown in Figs. 1, 3 and 9 is preferably used to reduce the torque impact when the automatic gear selector unit 38 changes from low to intermediate or from intermediate to high speed gear engagement, or, when the said automatic gear selector unit 38 changes from high to intermediate speed gear engagement, or, when power is applied suddenly to the driven shaft 13, or, when the speed of an automobile equipped with an automatic gear selector unit embodying the invention has its speed suddenly reduced so quckly that the T-shaped L-head cams 45 of the gear selector unit 38 do not have an opportunity to function.

In the preferred embodiment of the torque impact mechanism 14 indicated in the drawings, a centrally disposed cylindrical element 78 having a plurality of integral outwardly radially disposed equally circumferentially spaced lugs 79 is keyed on the end of the driven shaft 13 by a suitable key 80 as best illustrated in Fig. 9. A cylindrical cup shaped element 81 having a plurality of inwardly radially disposed equally circumferentially spaced lugs 82 as best illustrated in Fig. 9 is positioned in operating spaced relationship over the said cylindrical element 78 with the lugs 82 thereof positioned between the lugs 79 of the said cylindrical element 78; the said cylindrical cup shaped elements 81 being mounted on the driven shaft 130 for rotation therewith. The said driven shaft 130 is preferably rotatably mounted through a supplementary housing 1000 on suitable bearings 83 as best illustrated in Fig. 1. The said supplementary housing 1000 is preferably secured to the housing 10 by such means as the machine bolts 84. Compression springs 85 circumferentially disposed between the lugs 79 of the cylindrical element 78 and the lugs 82 of the cup shaped element 81 cushions the torque impact between the said cylindrical element 78 and the cup shaped element 81 of the torque impact mechanism 14 whereupon the torque impact throughout the entire gear selector unit 38 and the impact which occurs as a result of the contact between the ratchet stops 48, 50 and 52 and the low, intermediate and high speed gears 31, 33 and 35 respectively is cushioned.

The operation of the novel automatic variable speed transmission disclosed herein is manual for shifting from neutral to low or reverse and is accomplished in the conventional manner. However, once shifted into low gear, the automatic gear selector unit 38 engages low, intermediate or high speed gears fully automatically under the control of the speed of the driven shaft 13 when the operator of the motor vehicle retards the engine speed slightly.

The shifting of the driving gear 17 from neutral to low forward speed is accomplished in the conventional manner by manually causing the driving gear 17 splined on the drive shaft 11 to mesh with the gearing 271 of the triple idler gear 27. The triple idler gear 27 rotates the low speed gears 31, the intermediate speed gears 33 and the high speed gear 35 simultaneously, all at their various speeds freely with respect to each other and the driven shaft 13 on which they are rotatably mounted.

The gear selector unit 38 keyed on the driven shaft 13 for driving the same is normally rotated by the low speed gear 31 with the low speed ratchet stops 48 thereof constantly urged into engagement with the collar of the low speed gear 31 by the springs 56. As the speed of the driven shaft 13 is increased, the centrifugal force on the said T-shaped L-head cams 45 overcomes the centripetal force exerted thereon by the torsion springs 70 whereupon the said T-shaped L-head cams 45 move radially outward in unison until the intermediate speed ratchet stops 50 are permitted to engage the intermediate speed gear 33 which then drives the driven shaft 13. As the speed of the driven shaft 13 is again increased, the additional centrifugal force on the said T-shaped L-head cams 45 overcome the centripetal force exerted thereon by the torsion springs 70 and the said T-shaped L-head cams 45 move radially outward in unison until the high speed ratchet stops 52 are permitted to engage the high speed gear 35 which then drives the driven shaft 13. The converse is true as the speed of the driven shaft 13 is on the decrease rather than on the increase.

However, the operation of the automatic gear selector unit 38 as described in the foregoing paragraph only applies when the driver of a vehicle slows up the speed of the engine to which a transmission equipped with a gear selector unit embodying the invention is connected by releasing the accelerator of the said engine after the driven shaft 13 has been caused to rotate by the said engine at a sufficient speed to create the required centrifugal force to overcome the centripetal force exerted on the T-shaped L-head cams 45 by the torsional spring 70. This control of the operator of the vehicle over the automatic changing of gear ratios during acceleration of the vehicle is made possible by the contact of the bearing surface of the low and intermediate ratchet stops 48 and 50 having notches 58 therein by the low and intermediate speed gears 31 and 33 respectively at the complementary re-entrant contact surfaces 59 formed in the end face of the collars 310 and 330 thereof, the said contact being sufficient to prevent the said T-shaped L-head cams 45 from moving outward due to centrifugal force until pressure between the gears 31 and 33 and the low and intermediate ratchet stops 48 and 50 respectively is relieved by the temporary alleviation of power applied to the driven gears 31 and 33.

Because of the fact that the T-shaped L-head cams 45 permit the low, intermediate and high speed ratchet stops 48, 50 and 52 respectively to engage only one of the driven gears 31, 33 or 35 at a time, the gears that are not engaged by the ratchet stops at any particular stage of operation of the gear selector unit 38 will idle with the idler gear 271. Because of the fact that the low speed ratchet stops 48 are beveled and engage complementarily beveled notches in the low speed gears 31, the gear selector unit 38 serves as a free wheeling unit when power is relieved on the drive shaft 11 causing the rotation of the driving gear 17 to lag behind the speed required to drive the low speed gear 31. As hereinbefore mentioned the high speed ratchet stops may be beveled and the notches formed in the high speed gear 35 may be correspondingly beveled to permit free wheeling at high speed.

When the driving gear 17 is manually shifted into engagement with the reverse gear 37 as indicated by the dot and dash lines in Fig. 1, the forward speed gears 31, 33 and 35 idle with the idler gear 27 and the low speed ratchet stops 48 click by the notches 49 in the low speed gear 31.

Although but one embodiment of the invention has been disclosed and described in detail, it will be understood that various changes including the size, shape, arrangement and detail of the parts thereof may be made without departing from the spirit of the invention, and it is not my intention to limit the scope of the invention other than by the terms of the appended claims.

I claim:

1. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; sets of low, intermediate and high speed ratchet stops in said gear selector unit normally urged into engagement with the low, intermediate and high speed gears respectively; and means responsive to the speed of the said driven shaft adapted to selectively permit only one of the sets of low, intermediate or high speed ratchet stops to engage one of the said driven gears at a time whereby the gear ratio between the said drive shaft and driven shaft is automatically varied.

2. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; sets of low, intermediate and high speed ratchet stops in said gear selector unit normally urged into engagement with the low, intermediate and high speed gears respectively; means responsive to the speed of the said driven shaft adapted to selectively permit only one of the sets of low, intermediate or high speed ratchet stops to engage one of the said driven gears at a time whereby the gear ratio between the said drive shaft and driven shaft is automatically varied, the said low and intermediate speed ratchet stops being adapted to click out of engagement with said low and intermediate speed driven gears when the speed of the driven shaft exceeds the speed of the said driven gears.

3. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; sets of low, intermediate and high speed ratchet stops in said gear selector unit normally urged into engagement with the low, intermediate and high speed gears respectively; means responsive to the speed of the said driven shaft adapted to selectively permit only one of the sets of low, intermediate or high speed ratchet stops to engage one of the said driven gears at a time whereby the gear ratio between the said drive shaft and driven shaft is automatically varied, and interlock means adapted to cause all ratchet stops in each of the sets of low, intermediate and high speed ratchet stops to act in unison.

4. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; a plurality of low, intermediate and high speed ratchet stops in said gear selector unit normally urged into engagement with the low, intermediate and high speed gears respectively; means responsive to the speed of the said driven shaft adapted to selectively permit only the low, the intermediate or the high speed ratchet stops to engage one of the said driven gears at a time whereby the gear ratio between the said drive shaft and driven shaft is automatically varied, and interlock means adapted to cause all low, all intermediate and all high speed ratchet stops to act in unison responsive to the speed of the said driven shaft.

5. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof in radial alignment with respect to each other, the said driven gears having a plurality of axially disposed notches formed in the end faces thereof, a gear selector unit on said driven shaft rotatable therewith having a plurality of axially disposed ratchet stops normally urged into contact with said driven gears at the said axially disposed notches therein, a plurality of radially reciprocating cams responsive to the speed of the said driven shaft adapted to selectively permit said ratchet stops to engage only one of said driven gears at any one time, and means for causing said cams to reciprocate in coincidental intermittent steps.

6. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof in radial alignment with respect to each other, the said driven gears having a plurality of axially disposed notches formed in the end faces thereof, a gear selector unit on said driven shaft rotatable therewith having a plurality of axially disposed ratchet stops normally urged into contact with said driven gears at the said axially disposed notches therein, a plurality of radially reciprocating cams responsive to the speed of the said driven shaft adapted to selectively permit said ratchet stops to engage only one of said driven gears at any one time, and means for causing said cams to reciprocate in coincidental intermittent steps, the said axially disposed notches in the end face of the low and intermediate speed driven gears being circumferentially beveled and the ends of the low and intermediate speed ratchet stops being complementarily beveled to permit the said driven shaft to rotate faster than the said low and intermediate speed driven gears when engaged by the said beveled low and intermediate speed ratchet stops.

7. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof in radial alignment with respect to each other, the said driven gears having a plurality of axially disposed notches formed in the end faces thereof, a gear selector unit on said driven shaft rotatable therewith having a plurality of axially disposed ratchet stops normally urged into contact with said driven gears at the said axially disposed notches therein, a plurality of radially reciprocating cams responsive to the speed of the said driven shaft adapted to selectively permit said ratchet stops to engage only one of said driven gears at any one time, and means for causing said cams to reciprocate in coincidental intermittent steps, the said low and intermediate ratchet stops being provided with a suitably notchet bearing surface to engage complementarily re-entrant angularly disposed contact surfaces provided at the axially disposed notches formed in the end faces of the low and intermediate speed driven gears whereby to prevent the said cams from reciprocating responsive to the speed of the said driven shaft until the speed of the said driven gears lags behind the speed of the driven shaft.

8. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof in radial alignment with respect to each other, the said driven gears having a plurality of axially disposed notches formed in the end faces thereof, a gear selector unit on said driven shaft rotatable therewith having a plurality of axially disposed ratchet stops normally urged into contact with said driven gears at the said axially disposed notches therein, a plurality of radially reciprocating cams responsive to the speed of the said driven shaft adapted to selectively permit said ratchet stops to engage only one of said driven gears at any one time, and means for causing said cams to reciprocate in coincidental intermittent steps, the said axially disposed notches in the end face of the low and intermediate speed driven gears being circumferentially beveled and the ends of the low and intermediate speed ratchet stops being complementarily beveled to permit the said driven shaft to rotate faster than the said low and intermediate speed driven gears when engaged by the said beveled low and intermediate speed ratchet stops, the said ratchet stops being provided with a suitably notched bearing surface to engage complementarily re-entrant angularly disposed contact surfaces provided at the axially disposed notches formed in the end faces of the low and intermediate speed driven gears whereby to prevent the said cams from reciprocating responsive to the speed of the said driven shaft until the speed of the said driven gears lags behind the speed of the driven shaft.

9. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; sets of low, intermediate and high speed ratchet stops in said gear selector unit normally urged into engagement with the low, intermediate and high speer gears respectively; and means responsive to the speed of the said driven shaft operable when the speed of the said driven gears lags behind the speed of the driven shaft sufficiently to overcome the axial friction between the ratchet stops and the driven gear engaged thereby adapted to selectively permit only one of the sets of low, intermediate or high speed ratchet stops to engage one of the said driven gears at a time whereby the gear ratio between the said drive shaft and driven shaft is automatically varied.

10. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotatable thereby at various speeds in respect to each other mounted in nested relationship to each other on said driven shaft for free rotation in respect thereto, the said nested driven gears having one end face thereof in radial alignment with respect to each other, the said driven gears having a plurality of axially disposed notches formed in the end faces thereof, a gear selector unit on said driven shaft rotatable therewith having a plurality of axially disposed ratchet stops normally urged into contact with said driven gears at the said axially disposed notches therein, a plurality of radially reciprocating cams responsive to the speed of the said driven shaft adapted to selectively permit said ratchet stops to engage only one of said driven gears at any one time when the speed of the driven gears lags behind the speed of the driven shaft sufficiently to relieve the friction between the ratchet stops and the driven gear engaged thereby, and means for causing said cams to reciprocate in coincidental intermittent steps.

11. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; sets of low, intermediate and high speed ratchet stops in said gear selector unit normally urged into engagement with the low, intermediate and high speed gears respectively; and cams reciprocating responsive to the speed of the said driven shaft adapted to selectively permit only one of the sets of low, intermediate or high speed ratchet stops to engage one of the said driven gears at a time whereby the gear ratio between the said drive shaft and driven shaft is automatically varied, the said ratchet stops having sufficient bearing surface against the driven gears when engaged to prevent the said cams from reciprocating until the friction between a driven gear and the ratchet stops engaged therewith is relieved by the lagging of the speed of the engaged driven gear with respect to the driven shaft.

12. In a variable speed transmission, a drive shaft, an idler shaft and a driven shaft, a driving gear on said drive shaft, a triple idler gear on said idler shaft driven by said driving gear; low, intermediate and high speed driven gears in constant mesh with said triple idler gear simultaneously rotated thereby at various speeds with respect to each other mounted on said driven shaft freely rotatable with respect to said driven shaft, a gear selector unit mounted on said driven shaft rotatable therewith; sets of low, intermediate and high speed ratchet stops in said gear selector unit normally urged into engagement with the low, intermediate and high speed gears respectively; cams reciprocating responsive to the speed of the said driven shaft adapted to selectively permit only one of the sets of low, intermediate or high speed ratchet stops to engage one of the said driven gears at a time whereby the gear ratio between the said drive shaft and driven shaft is automatically varied, the said ratchet stops having sufficient bearing surface against the driven gears when engaged to prevent the said cams from reciprocating until the friction between a driven gear and the ratchet stops engaged therewith is relieved by the lagging of the speed of the engaged driven gear with respect to the driven shaft, and interlock means adapted to cause all ratchet stops in each of the sets of low, intermediate and high speed ratchet stops to act in unison.

WILLIAM HARTZ.